United States Patent
Tamai et al.

(10) Patent No.: US 8,290,740 B2
(45) Date of Patent: Oct. 16, 2012

(54) FORM MEASURING INSTRUMENT, FORM MEASURING METHOD, AND PROGRAM

(75) Inventors: Toshiyuki Tamai, Sapporo (JP);
Tomonori Goto, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 395 days.

(21) Appl. No.: 12/662,615

(22) Filed: Apr. 26, 2010

(65) Prior Publication Data

US 2010/0299104 A1 Nov. 25, 2010

(30) Foreign Application Priority Data

May 19, 2009 (JP) ................................. 2009-120705

(51) Int. Cl.
*G01B 21/02* (2006.01)

(52) U.S. Cl. ....................................... 702/168; 345/419

(58) Field of Classification Search .................. 702/168, 702/167, 150, 182–185; 345/419
See application file for complete search history.

(56) References Cited

U.S. PATENT DOCUMENTS

| 6,072,569 | A | 6/2000 | Bowen |
| 2002/0059041 | A1 | 5/2002 | Mills |
| 2004/0107073 | A1* | 6/2004 | Sakurada et al. ............. 702/167 |
| 2006/0209294 | A1 | 9/2006 | Murata |
| 2008/0201005 | A1* | 8/2008 | Hon et al. ..................... 700/109 |
| 2011/0062642 | A1* | 3/2011 | Yabe ............................... 269/37 |

FOREIGN PATENT DOCUMENTS

| GB | 2 422 015 A | 7/2006 |
| JP | A-5-231864 | 9/1993 |
| JP | B2-2551698 | 11/1996 |
| WO | WO 2007/018118 A1 | 2/2007 |

OTHER PUBLICATIONS

European Search Report dated Sep. 9, 2010 in corresponding European Application No. 10 163 182.8.

* cited by examiner

*Primary Examiner* — Edward Raymond
(74) *Attorney, Agent, or Firm* — Oliff & Berridge, PLC

(57) ABSTRACT

Form measuring instrument includes: first measuring means which moves contact piece from first position in parallel with second axis to trace surface of workpiece, measure amount of displacement of contact piece, to obtain first profile; second placing means which rotates workpiece about first axis by 90 degrees to place workpiece at second position from first position; second measuring means which moves contact piece from second position in parallel with second axis to trace surface of workpiece, measure amount of displacement of contact piece, to obtain second profile; extremum position calculating means which fits circles to first and second profiles and calculate positions, in direction parallel with second axis, of first and second extremums indicating circles' extremums; and moving means which moves workpiece in direction parallel with second axis and direction parallel with third axis such that positions, in direction parallel with second axis, of first and second extremums become 0.

18 Claims, 6 Drawing Sheets

FIG. 8
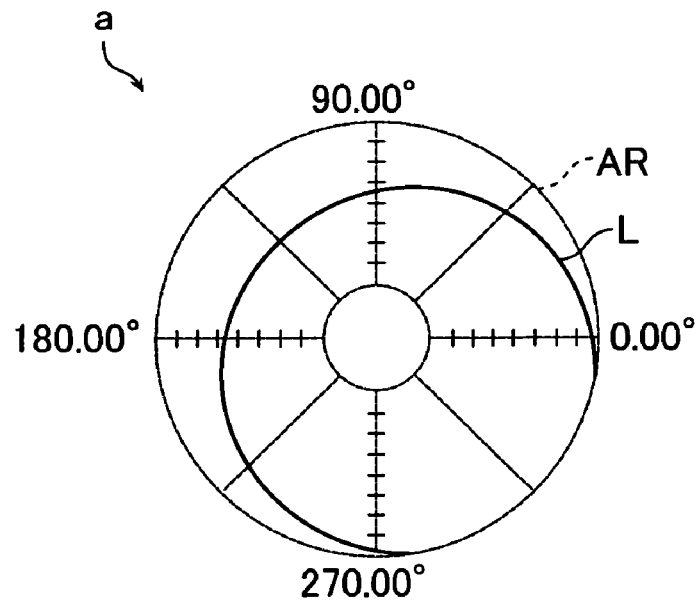
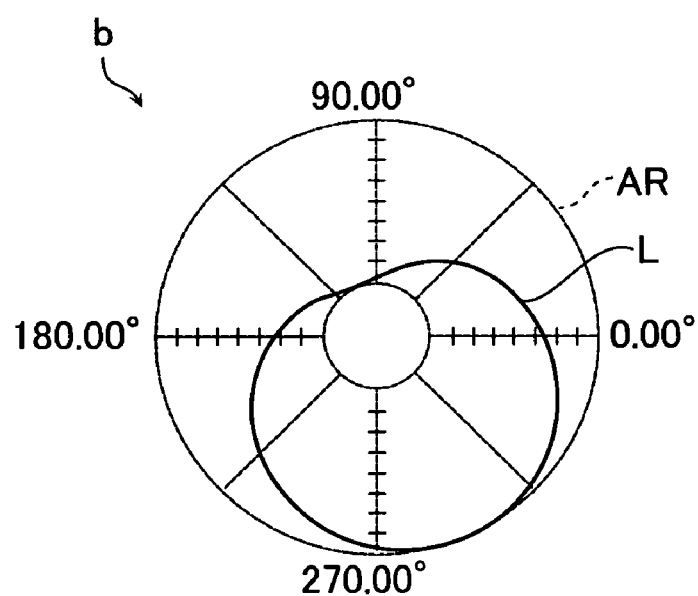

FORM MEASURING INSTRUMENT, FORM MEASURING METHOD, AND PROGRAM

CROSS REFERENCE TO RELATED APPLICATIONS

This application is based on and claims the benefit of priority from prior Japanese Patent Application No. 2009-120705, filed on May 19, 2009, the entire contents of which are incorporated herein by reference.

BACKGROUND OF THE INVENTION

1. Field of the Invention

The present invention relates to a form measuring instrument such as a roundness measuring machine which measures a displacement in synchronization with an angular position of rotation of a workpiece that is rotating about a specified rotation axis, a form measuring method, and a program.

2. Description of the Related Art

Conventionally, there has been known a roundness measuring machine which receives a workpiece on its table, rotates the table, and makes a measuring probe (a contact piece) scan the surface of the workpiece (see JPH5-231864A, JP2551698B). Such a roundness measuring machine has to have the contact piece calibrated in an X-axis direction and a Y-axis direction, so that the center of the workpiece may be aligned (centered) with the rotation axis of the table.

Currently, centering is performed by best-fitting data obtained by concentrically measuring an aspheric workpiece to aspheric surface design values. At this time, if the off-centering value of the workpiece is large, a radial position that is outside the range of a design value might be measured or an error contained in a detected value might become large. Therefore, the workpiece might stick out from the measuring region which the machine is guaranteed. In this case, the workpiece and the measuring machine might be damaged.

SUMMARY OF THE INVENTION

A form measuring instrument according to the present invention is a form measuring instrument operative to rotate a workpiece about a first axis, and measures a displacement of a surface of the workpiece at each angular position of rotation of the workpiece, the workpiece being a rotating object, the instrument comprising: a contact piece having a tip capable of contacting with the workpiece; first placing means operative to place the workpiece at a first position; first measuring means operative to move the contact piece from the first position in parallel with a second axis perpendicular to the first axis such that the contact piece traces the surface of the workpiece, thereby to measure an amount of displacement of the contact piece at each position along the second axis to obtain a first profile; second placing means operative to rotate the workpiece about the first axis by 90 degrees to place the workpiece at a second position from the first position; second measuring means operative to move the contact piece from the second position in parallel with the second axis such that the contact piece traces the surface of the workpiece, thereby to measure an amount of displacement of the contact piece at each position along the second axis to obtain a second profile; extremum position calculating means operative to fit circles to the first profile and second profile respectively, and calculate positions, in a direction parallel with the second axis, of a first extremum and a second extremum indicating extremums of the respective circles; and moving means operative to move the workpiece in the direction parallel with the second axis and in a direction parallel with a third axis perpendicular to the first axis and second axis, such that the positions, in the direction parallel with the second axis, of the first extremum and second extremum become 0.

A form measuring method according to the present invention is a form measuring method involving use of a form measuring instrument operative to rotate a workpiece about a first axis, and measure a displacement of a surface of the workpiece at each angular position of rotation of the workpiece, the workpiece being a rotating object, the form measuring instrument including a contact piece having a tip capable of contacting with the workpiece, the method comprising: placing the workpiece at a first position; moving the contact piece from the first position in parallel with a second axis perpendicular to the first axis such that the contact piece traces the surface of the workpiece, thereby to measure an amount of displacement of the contact piece at each position along the second axis to obtain a first profile; rotating the workpiece about the first axis by 90 degrees to place the workpiece at a second position from the first position; moving the contact piece from the second position in parallel with the second axis such that the contact piece traces the surface of the workpiece, thereby to measure an amount of displacement of the contact piece at each position along the second axis to obtain a second profile; fitting circles to the first profile and second profile respectively, and calculating positions, in a direction parallel with the second axis, of a first extremum and a second extremum indicating extremums of the respective circles; and moving the workpiece in the direction parallel with the second axis and in a direction parallel with a third axis perpendicular to the first axis and second axis, such that the positions, in the direction parallel with the second axis, of the first extremum and second extremum become 0.

A form measuring program according to the present invention is a form measuring program involving use of a form measuring instrument operative to rotate a workpiece about a first axis, and measure a displacement of a surface of the workpiece at each angular position of rotation of the workpiece, the workpiece being a rotating object, the form measuring instrument including a contact piece having a tip capable of contacting with the workpiece, the program controlling a computer to: place the workpiece at a first position; move the contact piece from the first position in parallel with a second axis perpendicular to the first axis such that the contact piece traces the surface of the workpiece, thereby to measure an amount of displacement of the contact piece at each position along the second axis to obtain a first profile; rotate the workpiece about the first axis by 90 degrees to place the workpiece at a second position from the first position; move the contact piece from the second position in parallel with the second axis such that the contact piece traces the surface of the workpiece, thereby to measure an amount of displacement of the contact piece at each position along the second axis to obtain a second profile; fit circles to the first profile and second profile respectively, and calculate positions, in a direction parallel with the second axis, of a first extremum and a second extremum indicating extremums of the respective circles; and move the workpiece in the direction parallel with the second axis and in a direction parallel with a third axis perpendicular to the first axis and second axis, such that the positions, in the direction parallel with the second axis, of the first extremum and second extremum become 0.

BRIEF DESCRIPTION OF THE DRAWINGS

FIG. 8 is a diagram for explaining an effect of the form measuring instrument according to an embodiment.

DETAILED DESCRIPTION OF THE EMBODIMENTS

An embodiment of the present invention will be explained with reference to the drawings.

[Embodiment]
[Configuration of Form Measuring Instrument According to Embodiment]

Figure 1:
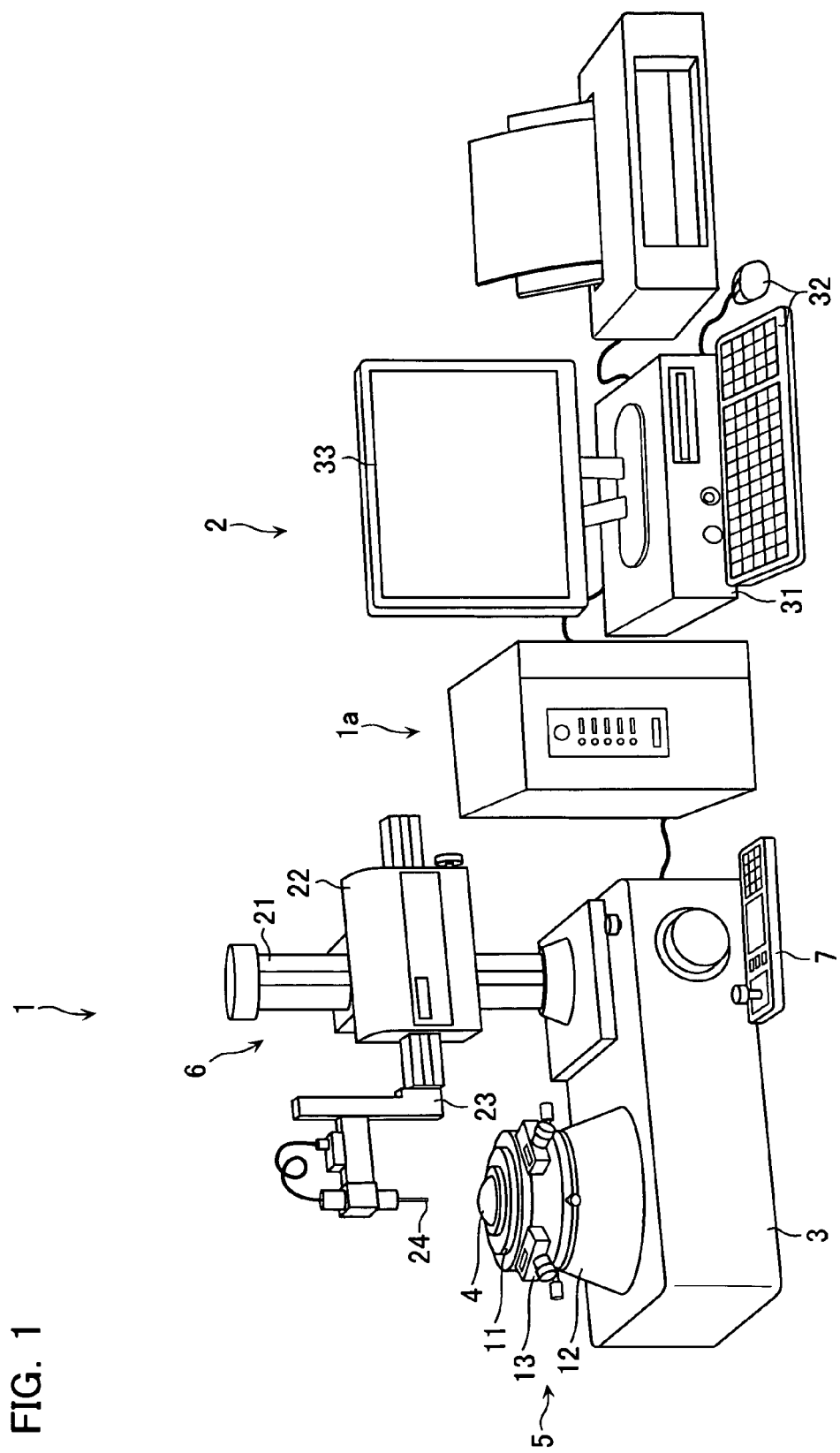
FIG. 1 is an appearance perspective diagram showing a schematic configuration of a form measuring instrument according to an embodiment.

First, the configuration of a form measuring instrument according to an embodiment will be explained with reference to FIG. 1. FIG. 1 is an appearance perspective diagram of a form measuring instrument (roundness measuring machine) according to an embodiment.

The form measuring instrument rotates a workpiece 4 about a specified rotation axis and measures a displacement of a surface of the workpiece 4 at each angular position of rotation of the workpiece 4. In the present embodiment, the workpiece 4 is a convex aspheric lens, which is a rotating object.

As shown in FIG. 1, the form measuring instrument includes a measuring unit 1 and an arithmetic processing device 2 connected to the measuring unit 1 via a drive control unit 1a. The measuring unit 1 includes a base mount 3, a table 5 provided on the base mount 3 and on which a workpiece 4 is placed, a displacement detecting unit 6 configured to detect a displacement of the workpiece 4 placed on the table 5, and an operation section 7 used for operating them.

The table 5 drives a disk-shaped stage 11 to rotate by means of a rotation drive unit 12 that is positioned below the stage 11, thereby to rotate the workpiece 4 placed on the stage 11. Adjustment knobs 13 are provided on the side surface of the rotation drive unit 12 at generally 90-degree intervals in the circumferential direction. Operating these adjustment knobs 13 allows for manual centering and leveling of the stage 11. That is, the stage 11 is constructed to be adjustable in X-axis, Y-axis, and Z-axis directions. The stage 11 is also constructed such that it is centered and leveled by a control unit 41, which will be described later. The X-axis, the Y-axis, and the Z-axis are perpendicular to one another.

The displacement detecting unit 6 is constructed as follows. That is, a column 21 that extends upward stands on the base mount 3, and a slider 22 is mounted on the column 21 in a way to be able to move up and down. A stylus 23 is attached to the slider 22. The stylus 23 can be driven in horizontal (X-axis, Y-axis) and vertical (Z-axis) directions, and has a contact piece 24 provided at the end. The contact piece 24 can bring its tip into contact the workpiece. The column 21, the slider 22, and the stylus 23 constitute a contact piece driving means.

By moving the slider 22 and the stylus 23 to make the contact piece 24 scan (trace) the surface of the workpiece 4 in the X-axis direction while rotating the table 5, it is possible to obtain an amount of displacement of the contact piece 24 at each position in the X-axis direction as measurement data (profile).

The arithmetic processing device 2 acquires measurement data obtained by the displacement detecting unit 6. The arithmetic processing device 2 includes an arithmetic processing unit 31 configured to execute arithmetic processing, an operation section 32, and a display screen 33. The arithmetic processing device 2 is configured to be able to control the operation of the measuring unit 1 like the operation section 7.

Figure 2:
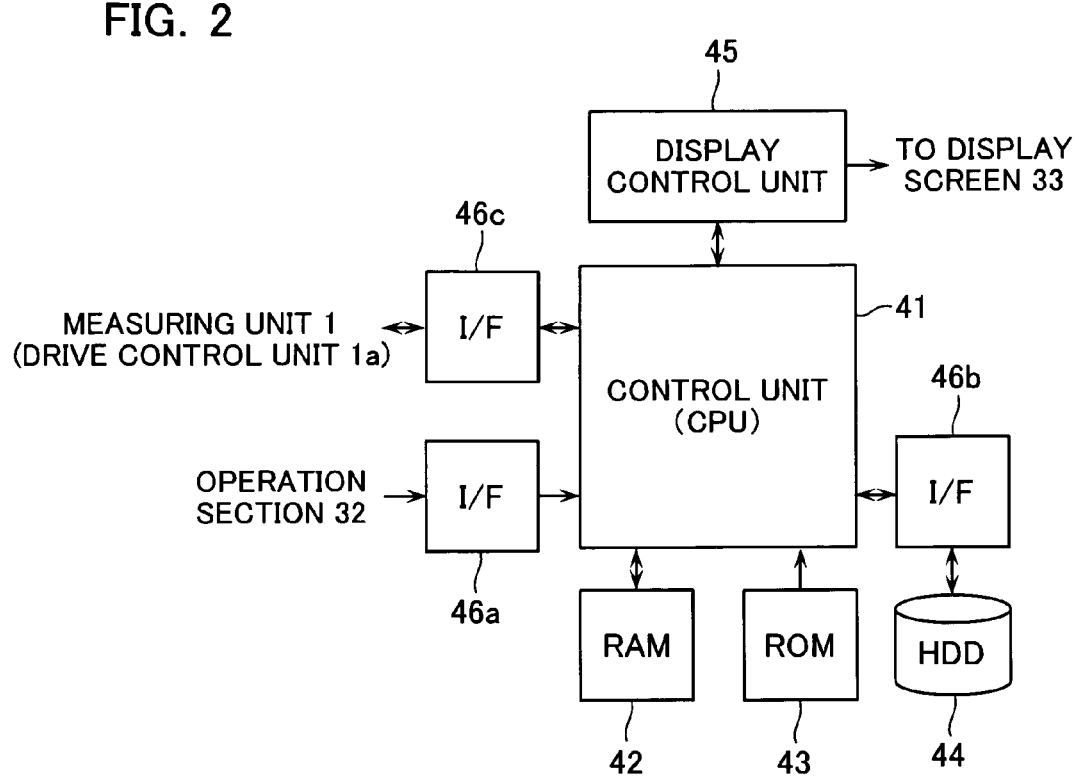
FIG. 2 is a block diagram showing a configuration of an arithmetic processing unit 31.

Next, with reference to FIG. 2, the configuration of the arithmetic processing unit 31 will be explained. As shown in FIG. 2, the arithmetic processing unit 31 mainly includes a control unit (CPU: Central Processing Unit) 41, a RAM (Random Access Memory) 42, a ROM (Read Only Memory 43, an HDD (Hard Disk Drive) 44, and a display control unit 45. In the arithmetic processing unit 31, code information and positional information entered from the operation section 32 are input to the control unit 41 via an I/F 46a. The control unit 41 executes various processes in accordance with a macro program stored in the ROM 43 and various programs that are loaded onto the RAM 42 from the HDD 44 via an I/F 46b.

The control unit 41 controls the measuring unit 1 via an I/F 46c in accordance with a measurement execution process. The HDD 44 is a recording medium that stores various control programs. The RAM 42 stores various programs and provides a work area for various processes. The control unit 41 displays a measurement result, etc. on the display screen 33 via the display control unit 45.

Figure 3:
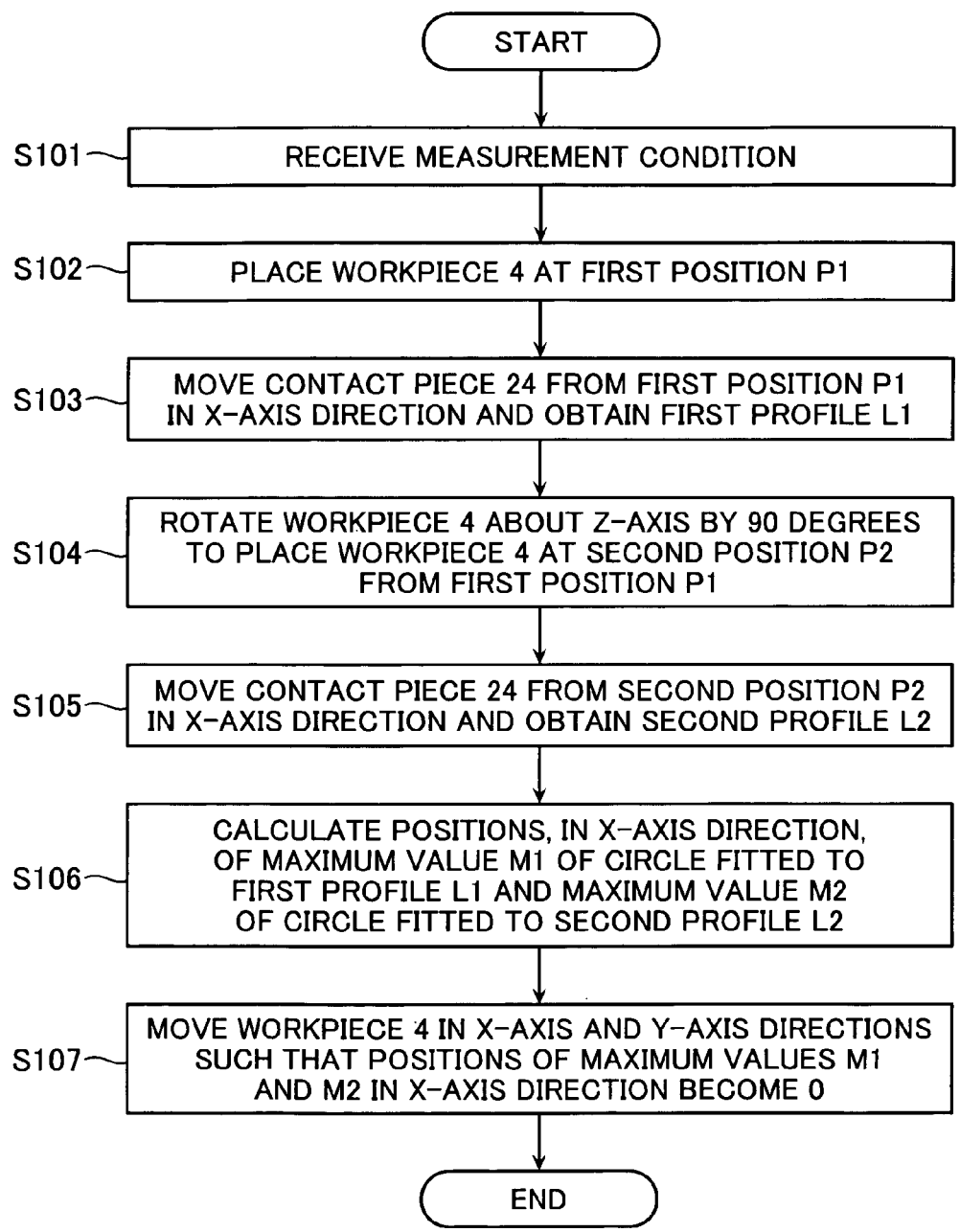
FIG. 3 is a flowchart showing an operation of the form measuring instrument according to an embodiment.

The control unit 41 reads out various programs from the HDD 44 and executes the following operation shown in FIG. 3 by executing the programs.

[Operation of Form Measuring Instrument According to Embodiment]

Next, with reference to the flowchart shown in FIG. 3, an operation of the form measuring instrument according to an embodiment for centering and leveling an aspheric workpiece by best-fit method will be explained. First, after roughly centering and leveling the workpiece 4, which is an aspheric workpiece and placed on the stage 11, the control unit 41 receives via the operation section 32 an input of measurement conditions, e.g., a radial position at which the measurement is started, a measurement length, an auto-set level for effectively using a measuring range, etc. (step S101). Next, the control unit 41 places the workpiece 4 at a first position P1 in accordance with the input measurement conditions (step S102). Specifically, the control unit 41 sets the angular position of rotation of the stage 11 to "0 degree".

Figure 4:
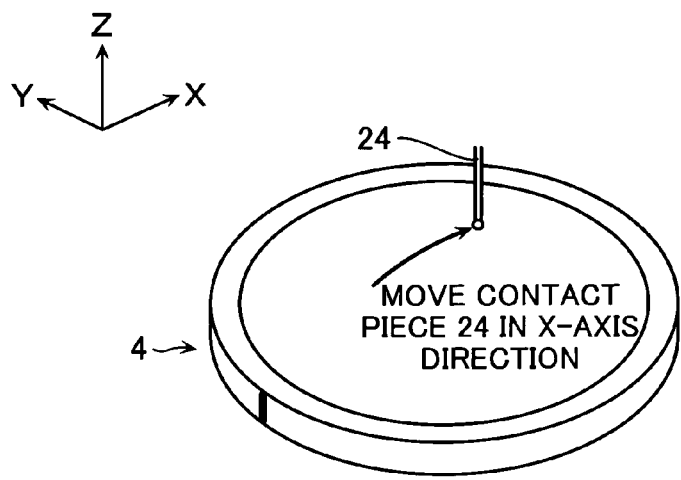
FIG. 4 is a schematic diagram showing step S103 of FIG. 3.

Then, as shown in FIG. 4, the control unit 41 moves the contact piece 24 from the first position P1 by a specified distance in the X-axis direction such that the contact piece 24 traces the surface of the workpiece 4, thereby to measure the shape of the surface to obtain a first profile L1 (direct measurement) (step S103). The first profile L1 represents an amount of displacement of the contact piece 24 at each position in the X-axis direction from the first position P1.

Figure 5:
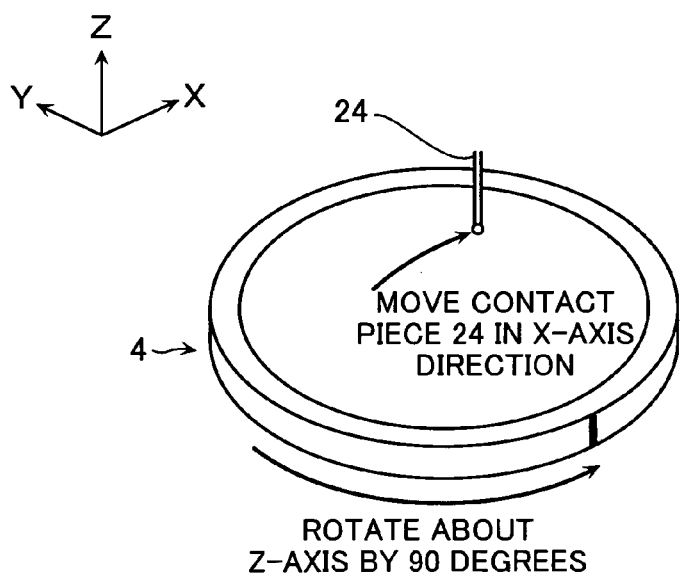
FIG. 5 is a schematic diagram showing steps S104 and S105 of FIG. 3.

Next, as shown in FIG. 5, the control unit 41 rotates the workpiece 4 about the Z-axis by 90 degrees to place the workpiece 4 at a second position P2 from the first position P1 (step S104). Specifically, the control unit 41 sets the angular position of rotation of the stage 11 to "90 degrees". Then, the control unit 41 moves the contact piece 24 from the second position P2 by a specified distance in the X-axis direction such that the contact piece 24 traces the surface of the workpiece 4, thereby to measure the shape of the surface to obtain a second profile L2 (direct measurement) (step S105). The second profile L2 represents an amount of displacement of the contact piece 24 at each position in the X-axis direction from the second position P2.

Figure 6:
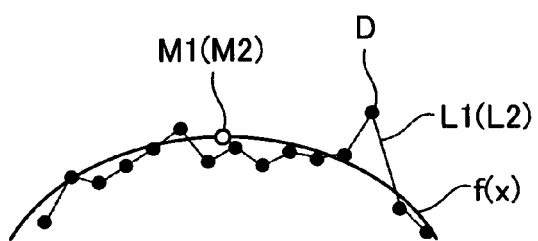
FIG. 6 is a schematic diagram showing step S106 of FIG. 3.

Then, the control unit 41 fits circles to the first profile L1 and the second profile L2 respectively in accordance with least square approach, and calculates the positions, in the X-axis direction, of the maximum values (extremums) M1 and M2 of the circles (step S106). For example, as shown in FIG. 6, the control unit 41 best-fits a function f(x) having an arc shape to measurement values D that constitute the first profile L1 (or the second profile L2) in accordance with least square approach, and obtains the maximum value M1 or M2 from the function f(x). By executing such a process, it is possible to suppress influence of a measurement value D that contains an error due to noise, etc.

Next, the control unit 41 moves the workpiece 4 in the X-axis direction and in the Y-axis direction such that the positions of the maximum values M1 and M2 in the X-axis direction become 0 (step S107). With this, the control unit 41 completes the operation.

Figure 7:
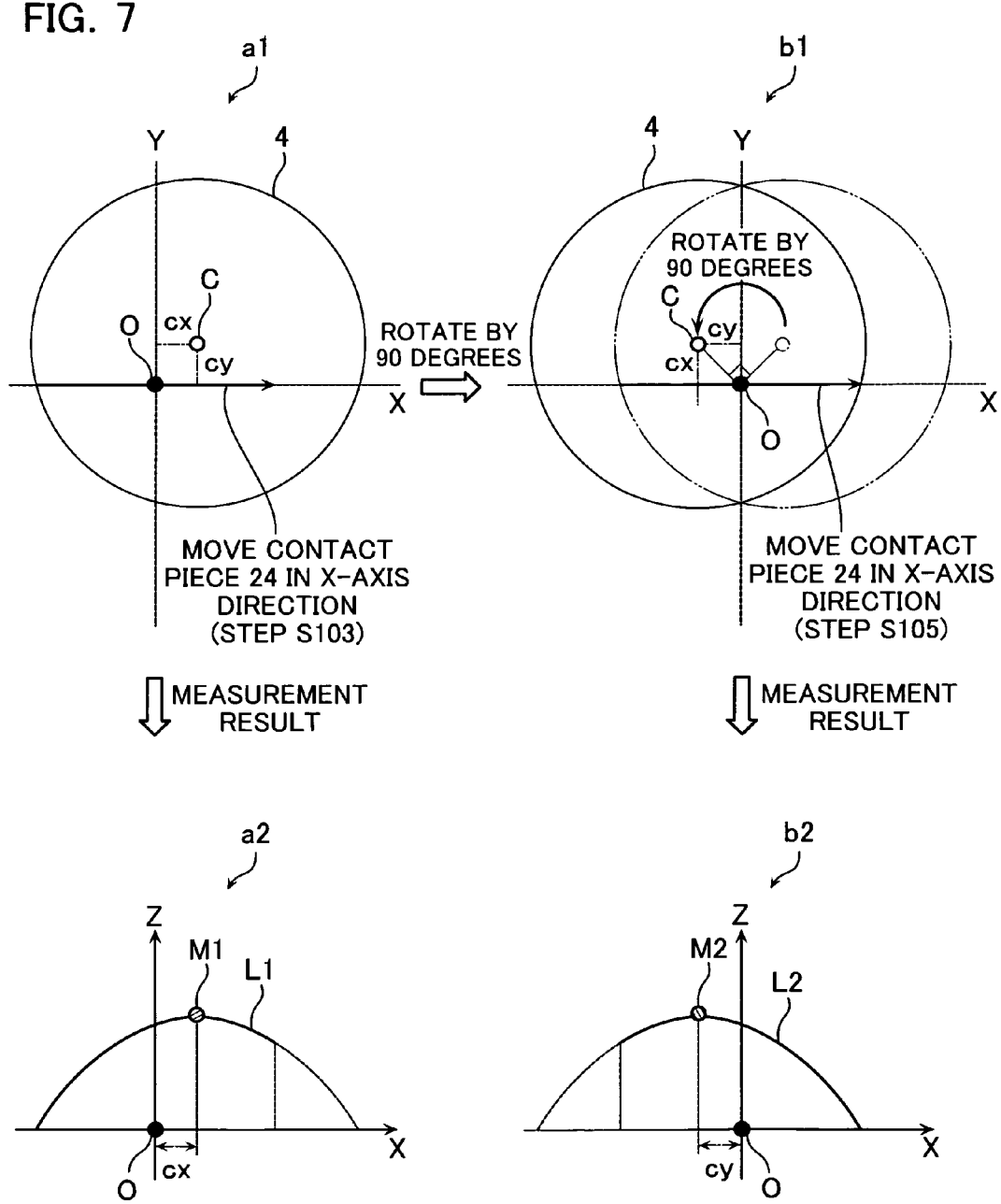
FIG. 7 is a diagram for explaining steps S103 and S105 of FIG. 3.

Next, with reference to FIG. 7, the processes of steps S103 to S105 described above will be explained in detail. In FIG. 7, it is assumed that when the workpiece 4 is set at the first position P1, the center C of the workpiece 4 is at a position that is away from the rotation axis O (Z-axis) by a distance cx in the X-axis direction and by a distance cy in the Y-axis direction. (a1) and (a2) of FIG. 7 show the measurement at the first position P1 (step S103). (a1) of FIG. 7 is an X-Y plane diagram, and (a2) of FIG. 7 is an X-Z plane diagram. (b1) and (b2) of FIG. 7 show the measurement at the second position P2 (step S105). (b1) of FIG. 7 is an X-Y plane diagram, and (b2) of FIG. 7 is an X-Z plane diagram.

By the measurement at step S103 shown in (a1) of FIG. 7, the first profile L1 shown in (a2) of FIG. 7 is measured. The maximum value M1 of the circle fitted to the first profile L1 is at the position cx in the X-axis direction as shown in (a2) of FIG. 7. That is, by this measurement, the control unit 41 can specify an amount of deviation cx of the center C of the workpiece 4 from the rotation axis O in the X-axis direction.

By the measurement at step S105 shown in (b1) of FIG. 7, the second profile 12 shown in (b2) of FIG. 7 is measured. The maximum value M2 of the circle fitted to the second profile L2 is at the position cy in the X-axis direction as shown in (b2) of FIG. 7. That is, by this measurement, the control unit 41 can specify an amount of deviation cy of the center C of the workpiece 4 from the rotation axis O in the Y-axis direction.

[Advantages of Form Measuring Instrument According to Embodiment]

Next, with reference to FIG. 8, an advantage of the form measuring instrument according to the embodiment will be explained. FIG. 8 shows an example where the contact piece 24 is made to trace the workpiece 4 while the workpiece 4 is rotated about the Z-axis, whereby a displacement of the surface of the workpiece 4 at each angular position of rotation of the workpiece 4 is measured and a profile L is obtained. In this case, before the processes of steps S101 to S107 shown in FIG. 3 described above are executed, the profile L is not fully contained within a measuring region AR as shown in (a) of FIG. 8. The measuring region AR is a region in which it is guaranteed that a stable measurement can be performed. That is, when the profile L is not fully contained within this region, an error in the amount to be detected will become larger, and the contact piece 24 and the workpiece 4 might be damaged.

On the other hand, after the processes of steps S101 to S107 shown in FIG. 3 described above are executed, the profile L is fully contained within the measuring region AR as shown in (b) of FIG. 8. That is, even when the off-centering value is large, the form measuring instrument according to the present embodiment can perform centering by a stable measurement with the above-described processes.

Further, conventional form measuring instruments perform centering by measuring at least five pieces of concentric measurement data. As opposed to this, through steps S101 to S107 of the present embodiment, the measurement includes only two direct measurements that are performed in the X-axis direction over a specified distance. Therefore, centering can be performed in a short time. Furthermore, the processes of the present embodiment are effective when the circumference of the workpiece 4 cannot be measured due to the shape of the workpiece 4 or setting conditions.

[Other Embodiment]

The embodiment of the form measuring instrument having been described, the present invention is not limited to the embodiment described above, but various alterations, additions, substitutions, etc. can be made within the scope of the spirit of the invention. For example, in the embodiment described above, the workpiece 4 is a convex aspheric workpiece such as a convex lens, etc. However, the workpiece 4 may be a concave aspheric workpiece such as a concave lens, etc. In the case of a concave lens, the control unit 41 may calculate the minimum values of the circles that are fitted to the first and second profiles L1 and L2 at step S106.

What is claimed is:

1. A form measuring instrument operative to rotate a workpiece about a first axis, and measure a displacement of a surface of the workpiece at each angular position of rotation of the workpiece, the workpiece being a rotating object, the instrument comprising:
    a contact piece having a tip capable of contacting with the workpiece;
    first placing means operative to place the workpiece at a first position;
    first measuring means operative to move the contact piece from the first position in parallel with a second axis perpendicular to the first axis such that the contact piece traces the surface of the workpiece, thereby to measure an amount of displacement of the contact piece at each position along the second axis to obtain a first profile;
    second placing means operative to rotate the workpiece about the first axis by 90 degrees to place the workpiece at a second position from the first position;
    second measuring means operative to move the contact piece from the second position in parallel with the second axis such that the contact piece traces the surface of the workpiece, thereby to measure an amount of displacement of the contact piece at each position along the second axis to obtain a second profile;
    extremum position calculating means operative to fit circles to the first profile and second profile respectively, and calculate positions, in a direction parallel with the second axis, of a first extremum and a second extremum indicating extremums of the respective circles; and
    moving means operative to move the workpiece in the direction parallel with the second axis and in a direction parallel with a third axis perpendicular to the first axis and second axis, such that the positions, in the direction parallel with the second axis, of the first extremum and second extremum become 0.

2. The form measuring instrument according to claim 1, wherein the extremum position calculating means fits the circles to the first profile and second profile by least square approach.

3. The form measuring instrument according to claim 1, wherein the circles are each constituted by a function having an arc shape.

4. The form measuring instrument according to claim 1, wherein the workpiece has a convex aspheric shape, and wherein the first extremum and second extremum are maximum values of the circles.

5. The form measuring instrument according to claim 1, wherein the workpiece has a concave aspheric shape, and wherein the first extremum and second extremum are minimum values of the circles.

6. The form measuring instrument according to claim 1, further comprising
measurement condition input means operative to receive an input of a measurement condition before the workpiece is placed at the first position.

7. A form measuring method involving use of a form measuring instrument operative to rotate a workpiece about a first axis, and measure a displacement of a surface of the workpiece at each angular position of rotation of the workpiece, the workpiece being a rotating object, the form measuring instrument including a contact piece having a tip capable of contacting with the workpiece, the method comprising:
placing the workpiece at a first position;
moving the contact piece from the first position in parallel with a second axis perpendicular to the first axis such that the contact piece traces the surface of the workpiece, thereby to measure an amount of displacement of the contact piece at each position along the second axis to obtain a first profile;
rotating the workpiece about the first axis by 90 degrees to place the workpiece at a second position from the first position;
moving the contact piece from the second position in parallel with the second axis such that the contact piece traces the surface of the workpiece, thereby to measure an amount of displacement of the contact piece at each position along the second axis to obtain a second profile;
fitting circles to the first profile and second profile respectively, and calculating positions, in a direction parallel with the second axis, of a first extremum and a second extremum indicating extremums of the respective circles; and
moving the workpiece in the direction parallel with the second axis and in a direction parallel with a third axis perpendicular to the first axis and second axis, such that the positions, in the direction parallel with the second axis, of the first extremum and second extremum become 0.

8. The form measuring method according to claim 7, wherein the circles are fitted to the first profile and second profile by least square approach.

9. The form measuring method according to claim 7, wherein the circles are each constituted by a function having an arc shape.

10. The form measuring method according to claim 7, wherein the workpiece has a convex aspheric shape, and wherein the first extremum and second extremum are maximum values of the circles.

11. The form measuring method according to claim 7, wherein the workpiece has a concave aspheric shape, and wherein the first extremum and second extremum are minimum values of the circles.

12. The form measuring method according to claim 7, further comprising
receiving an input of a measurement condition, before placing, the workpiece at the first position.

13. A form measuring program involving use of a form measuring instrument operative to rotate a workpiece about a first axis, and measures a displacement of a surface of the workpiece at each angular position of rotation of the workpiece, the workpiece being a rotating object, the form measuring instrument including a contact piece having a tip capable of contacting with the workpiece, the program controlling a computer to:
place the workpiece at a first position;
move the contact piece from the first position in parallel with a second axis perpendicular to the first axis such that the contact piece traces the surface of the workpiece, thereby to measure an amount of displacement of the contact piece at each position along the second axis to obtain a first profile;
rotate the workpiece about the first axis by 90 degrees to place the workpiece at a second position from the first position;
move the contact piece from the second position in parallel with the second axis such that the contact piece traces the surface of the workpiece, thereby to measure an amount of displacement of the contact piece at each position along the second axis to obtain a second profile;
fit circles to the first profile and second profile respectively, and calculate positions, in a direction parallel with the second axis, of a first extremum and a second extremum indicating extremums of the respective circles; and
move the workpiece in the direction parallel with the second axis and in a direction parallel with a third axis perpendicular to the first axis and second axis, such that the positions, in the direction parallel with the second axis, of the first extremum and second extremum become 0.

14. The form measuring program according to claim 13, controlling the computer to
fit the circles to the first profile and second profile by least square approach.

15. The form measuring program according to claim 13, wherein the circles are each constituted by a function having an arc shape.

16. The form measuring program according to claim 13, wherein the workpiece has a convex aspheric shape, and wherein the first extremum and second extremum are maximum values of the circles.

17. The form measuring program according to claim 13, wherein the workpiece has a concave aspheric shape, and wherein the first extremum and second extremum are minimum values of the circles.

18. The form measuring program according to claim 13, further controlling the computer to
receive an input of a measurement condition before placing the workpiece at the first position.

* * * * *